United States Patent
Bonahoom

(10) Patent No.: US 7,640,695 B2
(45) Date of Patent: Jan. 5, 2010

(54) PLANTER BOX

(75) Inventor: James G. Bonahoom, Grosse Pointe Farms, MI (US)

(73) Assignee: Arbor Pro Tree Service, Inc., Grosse Pointe Farms, MI (US)

( * ) Notice: Subject to any disclaimer, the term of this patent is extended or adjusted under 35 U.S.C. 154(b) by 83 days.

(21) Appl. No.: 11/399,090

(22) Filed: Apr. 6, 2006

(65) Prior Publication Data

US 2006/0230677 A1    Oct. 19, 2006

Related U.S. Application Data

(60) Provisional application No. 60/671,417, filed on Apr. 14, 2005.

(51) Int. Cl.
  *A01G 9/02*   (2006.01)
  *A01G 23/02*  (2006.01)
  *A01G 23/04*  (2006.01)
  *A01G 9/10*   (2006.01)

(52) U.S. Cl. ................. 47/73; 47/65.5; 47/76; 47/77; 47/86; 47/66.1; 220/4.01

(58) Field of Classification Search ........... 47/73, 47/74, 75, 76, 77, 84, 65.5, 66.7, 32.7, 32.8, 47/86, 65, 66.1; 217/13, 43 R; 206/423; 220/4.33, 692
See application file for complete search history.

(56) References Cited

U.S. PATENT DOCUMENTS

| | | | | | |
|---|---|---|---|---|---|
| 388,154 | A | * | 8/1888 | Stanley | 47/76 |
| 498,608 | A | * | 5/1893 | Aylworth | 47/76 |
| 1,776,375 | A | * | 9/1930 | Russell | 47/73 |
| 2,219,690 | A | * | 10/1940 | Leydecker | 47/76 |
| 2,261,384 | A | * | 11/1941 | Jones | 47/76 |
| 2,919,045 | A | * | 12/1959 | Waugh et al. | 220/4.34 |
| 3,006,496 | A | * | 10/1961 | Weiman | 217/12 R |
| 3,032,368 | A | * | 5/1962 | Schnellbacher et al. | 410/31 |
| 3,161,989 | A | * | 12/1964 | Sigler et. al. | 47/76 |
| 3,319,988 | A | * | 5/1967 | Smith | 111/101 |
| 3,662,490 | A | * | 5/1972 | Childs | 47/1.01 R |
| 4,454,683 | A | * | 6/1984 | Schauer et al. | 47/76 |
| 5,158,418 | A | * | 10/1992 | Korenek | 414/23 |
| 5,236,099 | A | * | 8/1993 | Fties et al. | 220/4.31 |
| 5,791,269 | A | * | 8/1998 | Oldford | 111/100 |
| 5,953,858 | A | * | 9/1999 | Loosen | 47/66.1 |
| 6,681,522 | B2 | * | 1/2004 | Marchioro | 47/65.5 |
| 6,942,442 | B1 | * | 9/2005 | Green | 414/23 |

* cited by examiner

*Primary Examiner*—Peter M Poon
*Assistant Examiner*—Kristen C Hayes
(74) *Attorney, Agent, or Firm*—Raggio & Dinnin, P.C.

(57) ABSTRACT

A planter box for transplanting or removing trees, shrubs, or plant material. The planter box includes four corner members and a first and second channel arranged on each corner member. The box has a plurality of wall members arranged within the channels. A plurality of fastening members are arranged between the corner members.

15 Claims, 4 Drawing Sheets

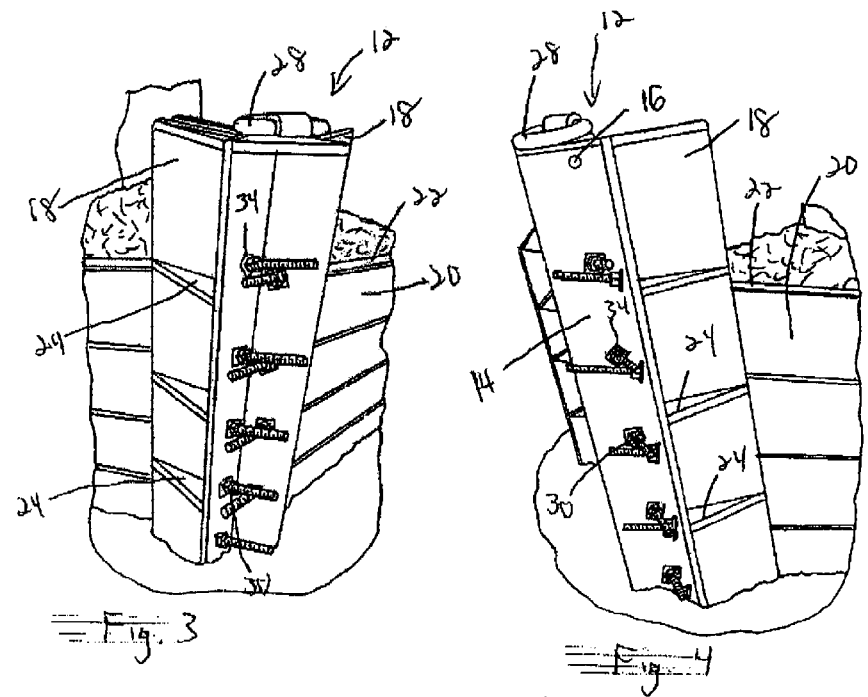
Fig. 3
Fig. 4
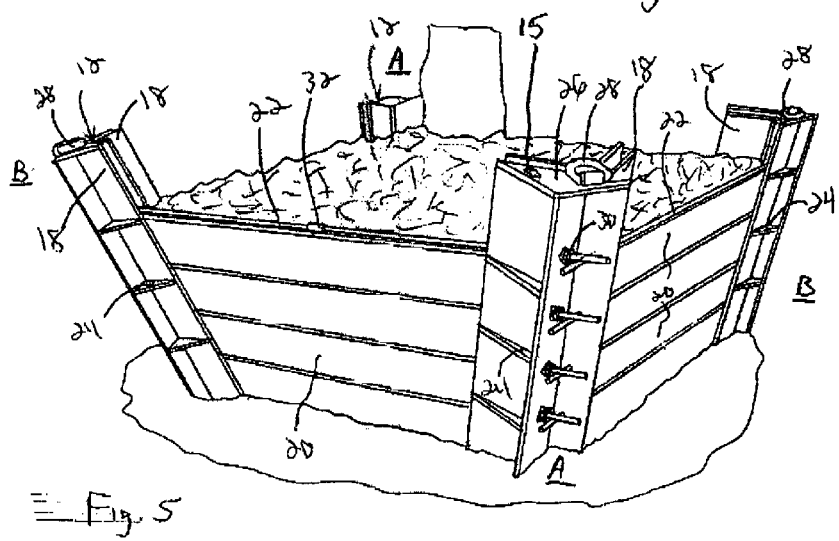
Fig. 5

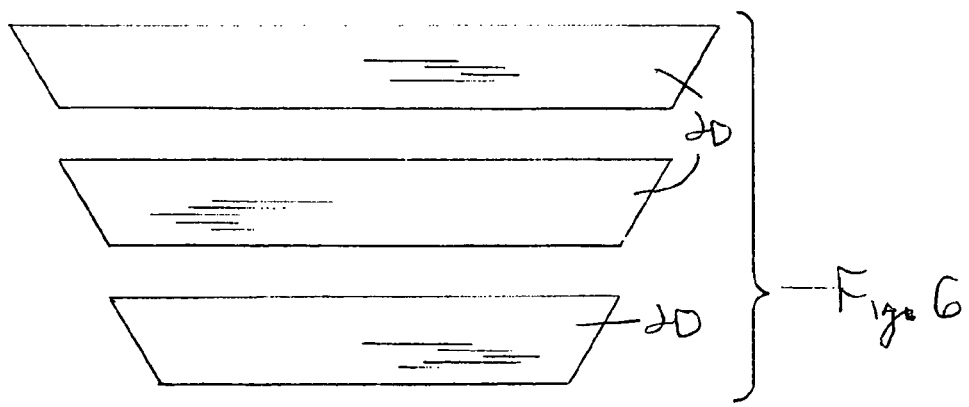
Fig. 6
Fig. 7
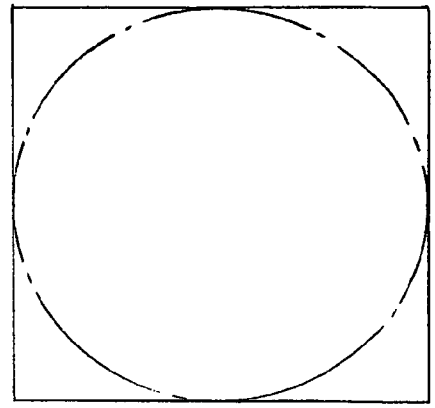
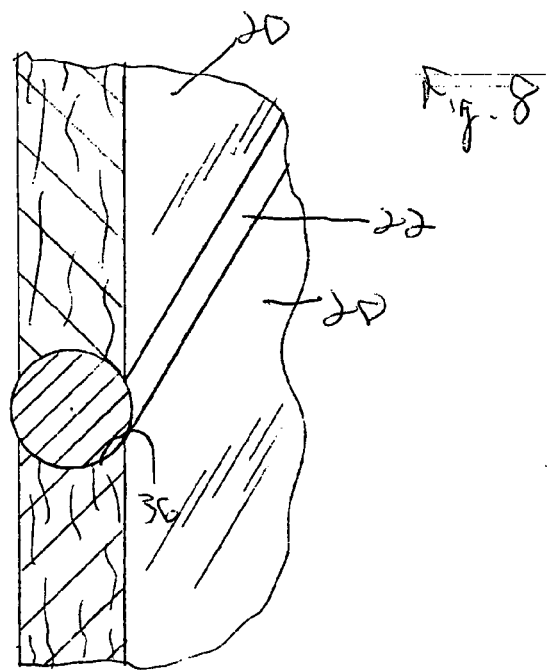
Fig. 8

PLANTER BOX

This application is a continuation in part of Provisional Patent Application No. 60/671,417, filed Apr. 14, 2005

BACKGROUND OF THE INVENTION

This invention generally relates to planter boxes and more particularly relates to a portable transplant planter box for use in moving trees, plant material, etc., and in controlling or manipulating transplanted trees to proper health and chemical balance before replanting.

Tree boxing or moving of large plant materials, such as trees, is a common practice that has been well known in the art for many years. One form of prior art tree boxing generally includes digging a hand dug hole around a tree and pruning or cutting the root system at a predetermined distance from the trunk of the plant material until a ball shape is formed. A box is built around the ball and made as rigid as possible. Next these prior art boxes have to be under dug so the box can have a bottom constructed to ensure that the ball of earth surrounding the tree does not fall through the hole at the bottom of the tree box. Once the bottom is on they can then get under the box and lift from the bottom of the tree box to remove it from the hole. Then the root ball and plant material is placed on a trailer, truck or other machinery in an upward position standing vertically. The use of these prior art tree boxes work fine for trees that have to be moved short distances to a new site, however the tree box has to be kept in a vertical upright position thus limiting the ability to move it long distances.

Other prior art methods are also known for moving large trees or other plant material. One other such method is a hand digging method where the tree is hand dug and wrapped by hand into a ball, this method is also known as the drum, lace and tie method. This method for transplanting large trees is very labor intensive due to the number of people needed to hand dig through all feeder roots and root systems to form a ball of suitable size around the tree or plant material. During hand digging the tree ball is wrapped in burlap and the burlap is secured via twine or other decomposable material to help assist in keeping the earth around the tree roots in the root ball. Any known method for cutting the roots at the bottom of the ball is used in hand digging such as using a metal cable that is pulled under the root ball to cut any roots that may extend in a downward direction from the root ball. After the root ball is wrapped a mechanical device, such as a truck, tractor, hi-lo, etc., is used to pull the tree ball and tree up an inclined ramp, which is also hand dug, to the new location for the tree. The problem with hand digging and wrapping the root ball is that the wrapping material is not very sturdy and also the tree must be removed from the site while the tree is dormant which limits it to predetermined seasons in the tree cycle depending on the region that the tree is located. In the far northern states large trees can only be transplanted in early spring or late fall. Furthermore, during storage of a hand dug tree in wood chips or other natural material feeder roots may begin to grow and break through the wrap thus increasing stress on the transplanted tree when it is finally placed at its new location because the new roots that extend from the burlap sack must be removed thus effecting the growth, livelihood and overall health of the tree being moved after its relocation.

There is also known in the prior art the use of tree a spade to remove trees. The tree spade is generally attached to a truck or other machinery. A tree spade is placed over a tree and digs a predetermined width and depth hole around the plant material or tree being moved. The transplanted tree is held within the blades of the tree spade for transportation to the new tree site. Tree spades are very effective during the dormant season of trees and are capable of moving trees short distances without causing too much stress to the transplanted tree. However, tree spades constantly hold the tree from the excavated site to the new transplant site and are not capable of placing the tree into a temporary storage unit to bring the tree back to a desired health before transplantation occurs.

Therefore, there are disadvantages to all of the above known methods for transplanting trees. Once such disadvantage is that the plant material can only be transplanted during the dormant stages of the plant material which reduces the time for transplanting the plant material and the time for decision making on the part of the owner for the transplanting of such plant material. Furthermore, the cost of hand digging and wrapping a tree can be exorbitant to some people thus leading to purchase of smaller trees and not transplanting of established trees. The use of tree boxes is also labor intensive due to all of the digging needed and the building of the box and the building of a sub floor along with the restrictions on moving the tree in an upright or vertical position to ensure that the tree ball does not disintegrate during moving or transplantation of the tree. The loss of earth from around a tree ball during transplanting of a tree adversely affects the odds of the tree surviving any such transplanting. It should be noted that problems have also been encountered with tree spading because of the hydraulic spade blades used to sever the roots of the tree system. The hydraulic system tends to shatter the roots and not make clean cuts through the feeder system of the roots. This degrades the root system and causes shock to the tree during the transplantation thereof. Also none of the prior art systems for transplanting trees are capable of lifting these trees from a top portion of the root ball of planter boxes. This restricts the type of machinery that can be used to transplant trees and the overall sizes of trees depending on the rating of such machinery. Furthermore, all of these prior art methods do not create a captive root system that is capable of being controlled and managed such that the tree can have a certain health and growing medium before transplanting into its new site.

Therefore, there is a need in the art for an improved transplanter box that is capable of easy installation and easy use for transplanting a tree. There also is a need in the art for a transplanter box that does not need to have a bottom inserted therein in order to remove a tree from a hole. There also is a need in the art for a transplanter box that is capable of being adjusted to different sized root balls or trees and the like. There also is a need in the art for multiple size tree transplanter boxes that are capable of being transported, at a predetermined optimum angle for moving trees, from location to location or stored at a location away from the transplant site.

There also is a need in the art for the ability to nurse and control or manipulate trees after initial removal from the ground such that the trees health and growing medium can have its ph, nutrients and other soil components brought to a desired level. This will increase the survivability of the tree and reduce transplant shock of the tree once it is placed in its new site. None of the prior art systems have a captive root system that is capable of being systemically monitored and fed with nutrients, herbicides and the like directly into the soil to increase the survivability and health of such a transplanted tree during the time that the tree is in temporary storage before it is planted at the new site.

SUMMARY OF THE INVENTION

One object of the present invention is to provide a novel and unique transplanter box.

Another object of the present invention is to provide a novel and unique transplanter box that has a flat bottom comprised of angled pieces. This will allow the box to follow the angle of the ground and prevent the corner pieces from sinking when assembled. This will also stop the undercut cable from getting entangled with the transplanter box during removal of the tree from the original site.

Another object of the present invention is to provide a transplanter box that is capable of being used in a variety of sizes using a variety of sized plank or wall members located between corner units.

Still another object of the present invention is to provide a transplanter box that is capable of being adjusted via a fastening mechanism such as a threaded rod to urge the corner members towards one another to secure the earth around the transplanted tree without the need for a bottom thereon.

Still another object of the present invention is to use a bottom section and top section for transportation mode to ensure any earth located within the transplanter box does not come loose during vibration of the tree over roads between transplant sites.

It is still another object of the present invention to provide offset and opposing sides which ensure more clearance room for the opposing rods and will create enough clearance underneath the transplant box to ensure for easy movement via hi-lo or other device from the bottom portion.

Still another object of the present invention is to provide a transplanter box that has a plurality of threaded rods arranged between a plurality of planks forming a wall therein.

These objects all create advantages over planter boxes found in the prior art and solve problems found in the prior art with the various methods known for transplanting plant material or trees.

Other objects, features and advantages of the present invention will become apparent from the following specification and accompanying drawings.

According to the present invention, the foregoing and other objects and advantages are obtained by a novel design for a transplanter box. The transplanter box includes a plurality of corner members which include angle irons and a plurality of rectangular tubing attached to the angle irons at predetermined angles. A plurality of triangular gussets are used to join the tubing to the angle iron. The gussets will provide the angle necessary between the tubing and the angle irons. Located at top end of the corner members is a D-ring or other ring member which is used for lifting of the transplanter box after the root ball is dug. The transplanter box also includes angled washers to apply even forced through the threaded rod members that are arranged between adjacent corner member in an offset pattern. The threaded rod members have a nut or other fastening device arranged on both ends thereof and are capable of being moved against washers thus drawing the corner pieces toward one another via the rods. This will squeeze or constrict the corner pieces towards one another thus squeezing and constricting a wall unit that is arranged within the rectangular tubing between each corner piece. The compressed walls may even exhibit a bowing effect thus compacting the root ball such that when the transplanter box is removed from the hole no dirt or earth will fall from the open bottom of the transplanter box. Tightening of the corner members will also have the effect of lifting the transplanter box off of the ground.

BRIEF DESCRIPTION OF THE DRAWINGS

FIG. 3 shows a perspective view of a corner member of the transplanter box according to the present invention.

FIG. 4 shows a perspective view of a corner member of the transplanter box according to the present invention.

FIG. 5 shows a perspective view of the transplanter box according to the present invention.

FIG. 6 shows wall boards used for the transplanter box according to the present invention.

FIG. 7 shows the difference in root ball size between a prior art root ball and a root ball according to the present invention.

FIG. 8 shows an end view of a threaded rod arranged between two boards of a wall of a transplanter box according to the present invention.

DESCRIPTION OF THE PREFERRED EMBODIMENT(S) AND BEST MODE FOR CARRYING OUT THE INVENTION

Figure 1:
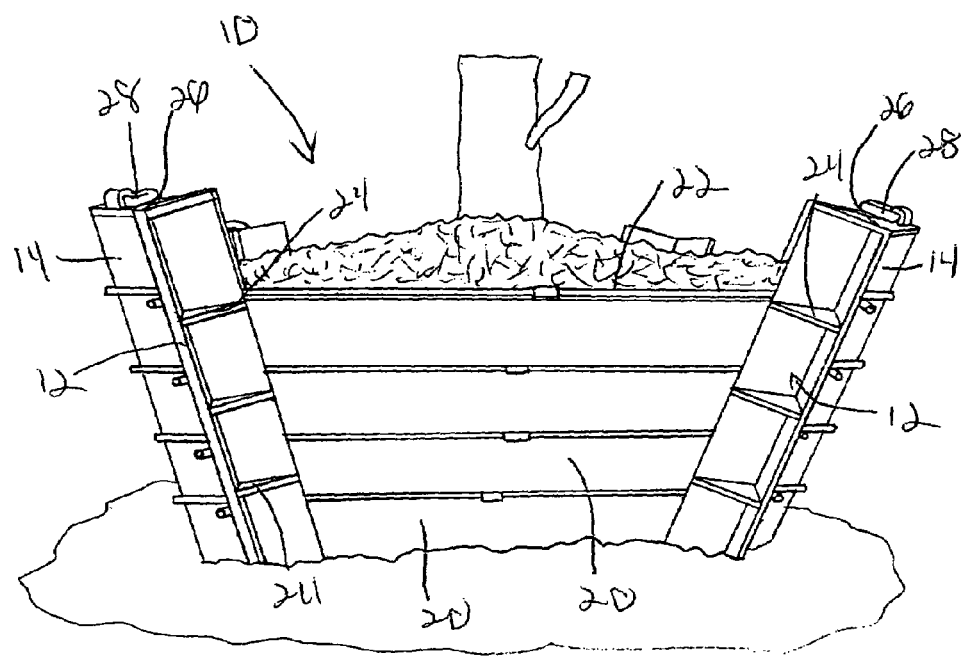
FIG. 1 shows a perspective view of a transplanter box according to the present invention.
Figure 2:
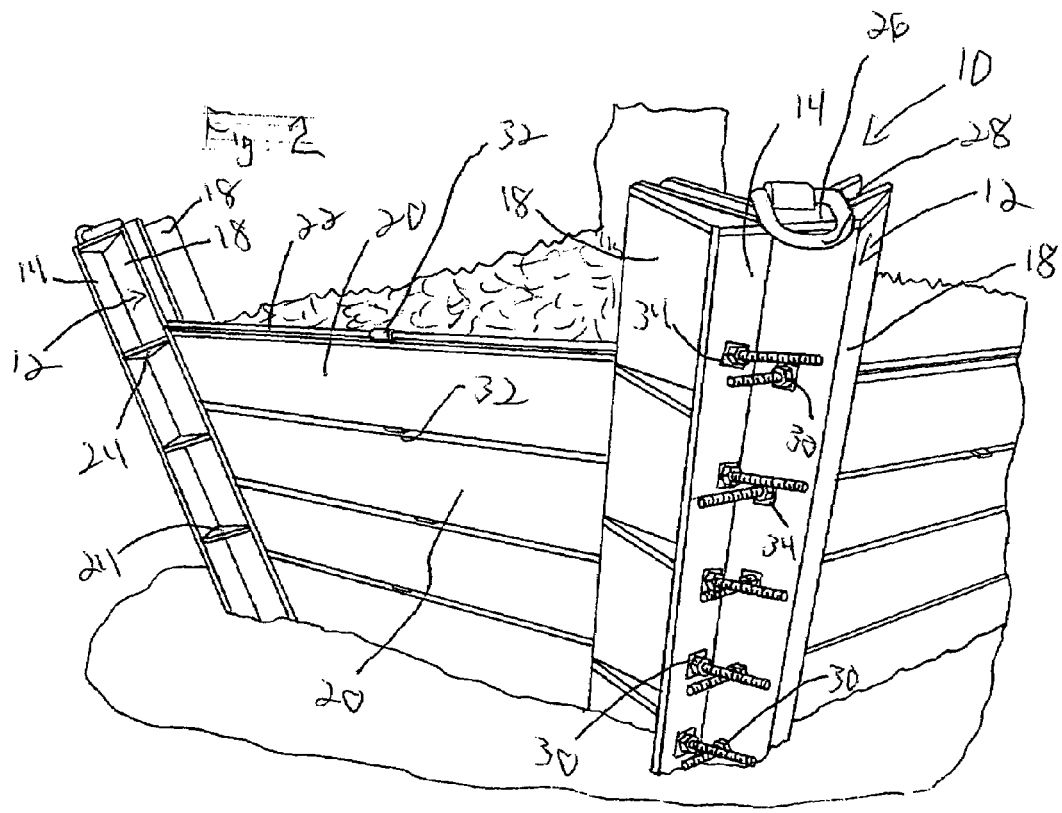
FIG. 2 shows a perspective view of a transplanter box according to the present invention.
Figure 9:
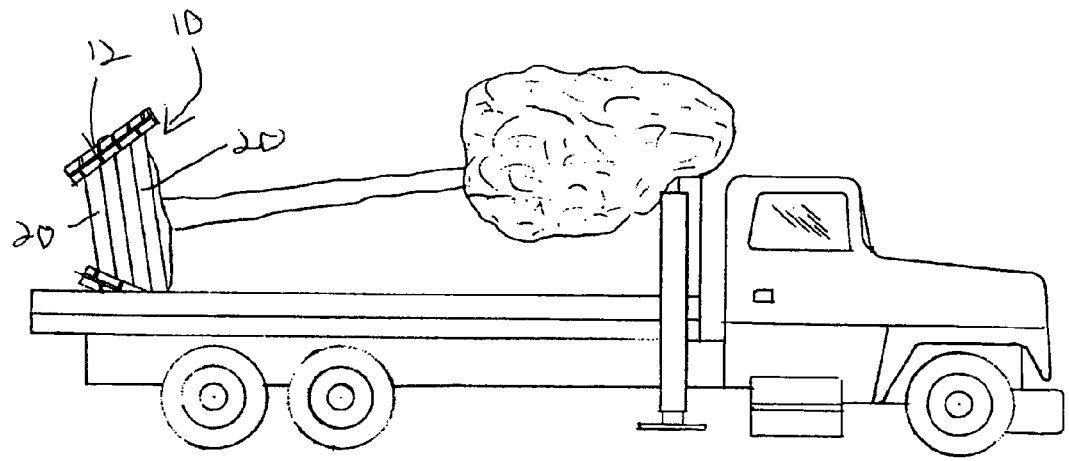
FIG. 9 shows the transplanter box according to the present invention on one of its angled sides during transportation of the plant material or tree.
Figure 10:
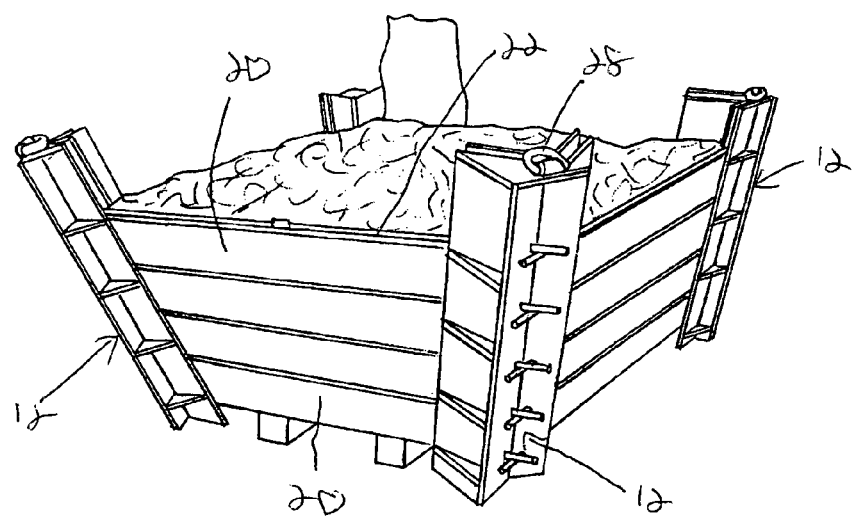
FIG. 10 shows bottom supports arranged under a transplanter box according to the present invention.

Referring to the drawings, FIGS. 1 through 10 show a transplanter box 10 according to the present invention. It should be noted that the transplanter box 10 can be used on any size tree and on any known size plant material. It is contemplated that the transplanter box 10 generally have a square like shape when viewed from above and that each top edge of the square transplanter box 10 can be sized from a couple of inches up to 14 feet depending on the size of the plant material being transported such as if it is a large tree, a hedge or a small plant. Thus, the size of the transplanter box 10 according to the present invention can be used on any known size tree, plant material or the like. It should be noted that a rectangular shaped transplanter box 10 when viewed from the top can also be used according to the present invention by varying the size of the side wall units.

The transplanter box 10 as shown in FIGS. 1 through 10 includes four corner members 12. The four corner members 12 have two corner members 12 identical to one another and the two others identical to one another. This will create two A members 12 and two B members 12 for construction of the transplanter box 10. The four corner members 12 are generally made of a steel material however any other high strength composite, metal, plastic, or natural material may also be used for the corner units 12. In the embodiment shown each corner member 12 includes a steel angle iron 14 having predetermined length and thickness walls extending from a point thereof. A plurality of orifices 16 are arranged through the angle iron 14 in a predetermined pattern such that they are offset from one another on opposing faces. The A and B corner members 12 will oppose each other. The corners 12 are arranged in an A-B-A-B pattern when viewed in a counter clock wise direction.

The corner members also include a first and second rectangular tube member 18 which has one of the short sides of the tube member 18 removed. This will form a first and second channel or sleeve 18 extending from the angle iron 14. It should be noted that the chamber 18 can be formed from any known component or method of making a sleeve or channel.

The channels 18 will be secured to the angle iron 14 at a predetermined angle to ensure for proper compression and compaction of the root ball within the transplanter box 10 to ensure the root ball is properly secured therein. The channel 18 has a predetermined depth which is necessary to hold a wall member 20 therein. Each of the channels 18 will have an orifice that mates with an orifice 16 on the angle iron 14 thus allowing for a fastening member or threaded rod 22 to pass through the channel 18 and the angle iron 14.

A plurality of gussets 24 are used to join the channel 18 to the angle iron 14. In the embodiment shown at least five gussets 24 having a triangular shape are used to secure and firmly hold the channels 18 at a predetermined angle from the angle iron 14. It should be noted that any shape gusset or support member may be used for the present invention. A cap or cover member 26 is secured to the top of the angle iron 14 to allow for connection of a ring or other holding device 28 capable of connecting to a mechanical device for lifting of the transplanter box 10 from the top thereof. In the embodiment shown common ⅞ inch D-ring hold-down rings 28 are used. It should be noted that the corners 12 are totally interchangeable as long as two A's and two B's are used and that the transplanter box 10 can be of any known size from as small as a couple of inches up to and including 14 feet per side as measured at the top. It should be noted that all of the pieces discussed are made of a steel material but that any other type of material such as metal, composites, plastics, natural materials may also be used. The chosen method for fastening the components of the corner members 12 to each other is welding however any other mechanical or chemical bonding method may be used to build and secure the components of the corner members 12 to each other.

Arranged within a pair of opposing channels 18 on corner members 12 adjacent to one another are wall members 20. The wall members 20 in the embodiment shown are boards 20 which are cut with the same side angles. This will create the exact angle of the side of the assembled transplanter box 10. The angle of the side of the assembled transplanter box 10 will allow for transportability of the tree inside the box 10. In the embodiment shown wooden boards 20 are used to create the side walls for the transplanter box 10. The angled boards 20 are shown as cut in FIG. 6. The top board 20 has the largest upper dimension of the top square of the transplanter box 10. Then the boards 20 gradually are reduced in size and all cut at the same angle to create the necessary angle for the finished transplanter box 10. It should be noted that the embodiment shown uses wooden boards, however any other known natural material or even metal materials, plastic materials, composite materials, or the like may be used for forming of the walls 20 of the transplanter box 10. It should be noted that a one piece wall is also contemplated to be used in the transplanter box 10. It should also be noted that any number of pieces may be used in the transplanter box 10 depending on the design and durability needed for moving of the tree. In use the wall boards 20 and rods 22 are stored in a kit depending on the size of the root ball that needs to be moved and made. Furthermore, certain boards and rods can be eliminated to create a more shallow root ball when appropriate. It should be noted that a standard corner member holds approximately five boards 20 and six rods 22.

The present embodiment shown also includes a plurality of threaded rods 22 that extend between adjacent corner members 12 through the orifices 16 in the channel 18 and angle iron 14. The threaded rods 22 are arranged such that they are offset from one another on adjacent angle iron walls. A rod 22 is placed between each plank or board 20 and will allow for compaction or urging of the corner members 12 towards one another. A threaded rod 22 is arranged through bottom orifice 16 of two adjacent corner members 12. Then a board 20 is arranged within the channel 18 so it is near the open end of the channel 18 and another rod 22 is arranged through the next set of orifices 16. Another board 20 is then arranged in the channel 18 and another rod is arranged through the next set of orifices 16 above the second board 20. This alternating pattern of rods 22 and boards 20 is continued until the entire transplanter box 10 is built up around the root ball as dug. Then the threaded rods 22 have a fastening device such as a nut 30 is arranged over each end thereof and the nuts or the fastening devices 30 are rotated such that the nuts will pull the corner members 12 towards the adjacent corner member 12 which is also having its nuts 30 being tightened or rotated. This will urge the corner members 12 towards one another thus pulling the corner members 12 in a generally inward position towards the trunk of the tree or plant material being moved. An angled washer 34 is arranged between each of the nuts 30 and a surface of the angle iron 14 in each corner member 12. This will also compress the wall members 20 into the end of channels 18 extending from the corner member 12. In fact in one embodiment the compression and compaction of the root ball via the adjustability of the threaded rods 22, will cause a bowing of the wall boards 20 thus leading to high forces which will ensure the earth of the root ball will not exit or drop from the transplanter box 10. It should be noted that in the embodiment shown a ⅝" threaded rod 22 is used. However, other size rods made of any other known metal, steel, plastic, composite, or the like may be used. It is even contemplated to just thread the ends of a rod 22 to reduce costs. It should also be noted that it is contemplated to use a flange 32 extending from any portion of the rod 22 which will extend between boards 20 to ensure the rod 22 does not spin during tightening of the nuts 30 on each end thereof. It is also contemplated to use a sleeve in which the rod 22 is placed to ensure protection of the rod 22 and reduce corrosion of the rod 22 during long term storage of the tree in the transplanter box 10.

It should also be noted, as shown in FIG. 8, that the boards 20 may have a rounded groove 36 on each edge thereof to hold and secure the rod 22 in position between the wall boards 20 to decrease bending moments on the threaded members 22. Tightening of the threaded members 22 on each end thereof will urge the corner members 12 towards one another and towards a center point of the transplanter box 10. This will ensure compaction and necessary forces are created on the earth surrounding the tree. The corner members 12 are designed such that a cutting cable can be used to cut the root system under the box 10 once the box 10 is completely filled and torqued down. The transplanter box 10 then will be capable of being lifted via the D-rings 28 or other lifting devices from the top onto the ground or a transportation vehicle at the optimum predetermined angle. The corner members 12 may also include a key hole 15 through a surface thereof. The key hole 15 may receive a chain therein to allow for securing the box 10 to a truck or the like or even to lift the box 10 from the hole or truck. The key hole 15 generally has a circular portion with a generally rectangular portion extending from the circular portion on two sides thereof. It is also contemplated to have a plurality of key holes 15 on each corner member 12.

In operation the transplanter box 10 according to the present invention is used as follows. A ball is dug and shaped in the ground around the plant material or tree as close as possible to the closed shape of the transplanter box 10 of the present invention. The corners 12 are then arranged in the hole in the alternating A-B-A-B pattern. Next the side boards 20 which form the walls are inserted along with the rods 22 to build the box 10 around the root ball. The boards 20 will be arranged in the channels 18 such that they are near the open end of channels 18 and the rods 22 will be arranged through the orifices 16 of two of the corner members 12. Next, the transplant operator will tighten the nuts 30 on the rods 22 from both ends of the rod 22 which will in turn constrict the box 10 around the root ball. This constriction and tightening allows for the earth and ball to remain in place when the transplanter box 10 is removed from the ground. The bottom of the root ball is finished in the same manner as a hand dig operation where a heavy duty cable or cutting device is pulled in a loop under the ball which will cut through any roots that are extending down and makes a clean cut at the bottom of the root ball. With the root ball compacted in the transplanter box 10 a rigid structure is created. The dirt, roots and the tree will become a single unitary member with the box 10 all of which becomes part of the same system and forms a rigid transplanter box 10 that is capable of being moved without having a bottom secured thereover. Once the transplanter box 10 is secured around the ball the transplant box can lift the tree from the hole with no bottom because the compaction process created necessary forces to constrict the dirt and earth which will prevent the dirt and earth from falling through the bottom orifice of the transplanter box 10. Furthermore, the lifting is done from the top of the transplanter box 10 at each corner due to the rigidity and robustness of the corner members 12 being tied to one another. The support developed by compression and constriction of the box 10 created by the compacted dirt inside leads to a self contained root ball system unit that is capable of being moved and stored for very long periods of time if need be. A unique feature of the transplanter box 10 is that it is capable of being placed on its side for transportation at a predetermined optimum angle that will cause less stress and damage to the tree during transportation over many miles.

Other advantages of the transplanter box 10 according to the present invention are that the plant can stay in the transplanter box 10 and reestablish a feeder root system. The plant can also be installed at any time of the year in its new location because the new feeder roots are not disturbed when the tree is in the new hole and the box 10 is removed. Furthermore, recovering plants can be inventoried while improving leaf color or cover, pruning for better structure, and are capable of being monitored for transplant shock symptoms and having such transplant shock symptoms controlled and managed thus increasing the trees health and growing medium through proper systemic addition of nutrients, herbicides into the soil to create a proper ph and nutrient system for the tree before it is placed in its new transplant location. Furthermore, the transplanter box 10 for the present invention will allow the tree once it is recovered to increase its odds of living in its new location in the ground with the same vigor as that of its previous location. It should also be noted that the transplanter box 10 is totally reusable as long as the A and B corners 12 are kept together. The rods 22 and boards 20 need to be kept in kits such as 5', 4', 6', etc., up to 14' kits, as long as the kits are kept together any size box can be built depending on the users need and the size of the tree or other plant material to be moved.

It should also be noted that another advantage of the transplanter box 10 according to the present invention is that the shape of the tree box compared to a prior art tree spade and prior art hand digging round balls is increased by at least a factor of 20%. This 20% increase in surface area over that of prior art methods for transplanting a tree will ensure that the corners of the transplanter box 10 according to the present invention are filled with feeder roots that are very critical to save when large trees are transplanted to different locations. The more feeder roots that are capable of being placed within the root ball the greater the odds of the tree surviving transplanting. It should be noted that it is contemplated to cut the square hole for use with the transplanter box 10 according to the present invention having a predetermined angle from top to bottom using a trenching machine to cut the roots. The trenching machine by its nature makes a clean cut on the roots to which the remainder of the hole can be dug with a back-ho or other equipment or even hand tug depending on the shape of the tree and the size of the root ball needed. It should also be noted that other methods of cutting the square hole are also contemplated including hand cutting, using various machinery, or tools connected to tractors or the like.

It should further be noted that the transplanter box 10 described above is capable of being used for any size plant material from a couple of inches for each side of a square to 14 feet for each side of a square and/or rectangular or other shape depending on the plant system to be moved or transplanted. It should also be noted that other methods of urging or tightening the corner members 12 with respect to one another are also contemplated to be used. These other methods can be any known mechanical method such as a threaded screw or any other mechanical means known which are capable of moving members toward one another. It is also contemplated to use hydraulic, pneumatic, electronic, or spring based systems to create the necessary forces to urge or move the corner members 12 towards one another. Therefore, any number of combination of methods can be used to create the necessary forces to create the compaction and squeezing of the transplanter box 10 around the root ball. It should also be noted that if the root ball is not dug in its correct entire shape, i.e., of the assembled transplanter box 10, dirt or other earth can be back filled during construction of the box 10 to ensure complete compaction of the root ball within the transplanter box 10.

While it may be apparent that the preferred embodiment in the invention disclosed is well calculated to fill benefits, objects or advantages of the present invention, it should be appreciated that the invention is susceptible to modification, variations and change without departing from the proper scope of the invention as shown.

What is claimed is:

1. A planter box, said box comprising:
   four corner members, two of said corner members are identical to one another and said other two are identical to each other, said corner members are arranged in A-B-A-B pattern when viewed in a counter clockwise direction;
   a first and second channel arranged on each of said corner members;
   a plurality of wall members arranged within said channels, each end of said wall members are cut at a predetermined angle, said predetermined angle defines an angle of a side of the box, each said side of the planter box having said wall members of different lengths with a longest of said wall members arranged at a top of the planter box and a shortest of said wall members at a bottom; and
   a plurality of fastening members arranged between said corner members, each of said wall members having a first groove along a first longitudinal edge thereof and a second groove along a second longitudinal edge thereof, said fastening members arranged within said grooves.

2. The box of claim 1 wherein said corner members having an angle iron.

3. The box of claim 2 further comprising a plurality of gussets arranged between said channels and said angle iron.

4. The box of claim 1 wherein said corner members having a plurality of orifices therethrough.

5. The box of claim 4 wherein said orifices are offset from one another on opposing faces thereof 6. The box of claim 1 wherein said fastening member is a threaded rod, said threaded rod having a flange extending therefrom and extending between two of said wall members, said flange prevents said fastening members from spinning with relation to said wall members.

7. The box of claim 1 further comprising a cover arranged on a top surface of said corner members.

8. The box of claim 7 further comprising a ring attached to said cover.

9. The box of claim 1 further comprising a key hole arranged through said corner member.

10. The box of claim 1 wherein said wall members are boards.

11. The box of claim 1 wherein said fastening members having a nut on each end, when said nuts are tightened two of said adjacent corner members are urged toward one another.

12. A transplant box for use in transplanting or moving trees, shrubs, and other plant material, said box comprising:

four corner members;

a first and second channel attached to each of said corner members, said channels having a predetermined depth;

a plurality of wall members arranged within one of said channels of said corner members on one end and in one of said channels on an adjacent said corner member on an opposite end; and a plurality of threaded rods arranged between adjacent said corner members and arranged between wall members, said threaded rods urge said corner members toward the material being moved providing for a compression and compaction of the transplant box around the material being moved such that the transplant box is used without a bottom.

13. The box of claim 12 further comprising a nut arranged on each end of said plurality of rods, a cover secured to a top portion of each of said corner members and a ring connected to said cover.

14. The box of claim 12 further comprising a plurality of orifices through said corner members and said channels, a predetermined number of said orifices arranged on a face of said corner member, another predetermined number of said orifices arranged on an opposing face of said corner member and offset from said orifices on said other face.

15. The box of claim 12 wherein said corner members having an angle iron and a plurality of gussets arranged between said angle iron and said channels.

* * * * *